United States Patent [19]
Kondo et al.

[11] Patent Number: 5,123,729
[45] Date of Patent: Jun. 23, 1992

[54] PROJECTION DISPLAY DEVICE

[75] Inventors: Mitsushige Kondo; Shinsuke Shikama; Eiichi Toide; Hiroshi Kida; Masahiro Usui, all of Nagaokakyo, Japan

[73] Assignee: Mitsubishi Denki Kabushiki Kaisha, Tokyo, Japan

[21] Appl. No.: 687,942

[22] Filed: Apr. 19, 1991

[30] Foreign Application Priority Data

Apr. 20, 1990 [JP] Japan .................. 2-106023

[51] Int. Cl.$^5$ ............................ G03B 21/28
[52] U.S. Cl. ........................ 353/99; 353/37; 353/102; 359/49
[58] Field of Search ............ 353/122, 30, 31, 34, 353/37, DIG. 3, 82, 98, 99, 102; 350/345, 331 R; 359/48, 49

[56] References Cited

U.S. PATENT DOCUMENTS

| | | | |
|---|---|---|---|
| 3,264,467 | 8/1966 | Mann et al. | 353/99 |
| 3,893,758 | 7/1975 | Houzinger et al. | 353/20 |
| 4,127,322 | 11/1978 | Jacobson et al. | 353/37 |
| 4,191,456 | 3/1980 | Hong et al. | 353/34 |
| 4,464,019 | 8/1984 | Gagnou | 353/31 |
| 4,912,614 | 3/1990 | Goldenberg | 353/31 |
| 4,971,436 | 11/1990 | Aoki et al. | 353/31 |

Primary Examiner—William A. Cuchlinski, Jr.
Assistant Examiner—William C. Dowling

[57] ABSTRACT

In a projection display device having an illumination optical system which converts the light emitted from a point light source into a substantially parallel luminous flux, a light valve which modulates the light flux, and an optical projection system which projects images on the light valve onto a screen, the illumination optical system converts the light into a substantially parallel luminous flux having a cross section of substantially the same size and shape, e.g., rectangular shape, as the shape of the frame of the light valve.

8 Claims, 9 Drawing Sheets

PROJECTION DISPLAY DEVICE

FIELD OF THE INVENTION

The invention relates to a projection display device, and particularly to an optical illumination system of a projection display device utilizing one or more image-forming light valves.

BACKGROUND OF THE INVENTION

Figure 7A:
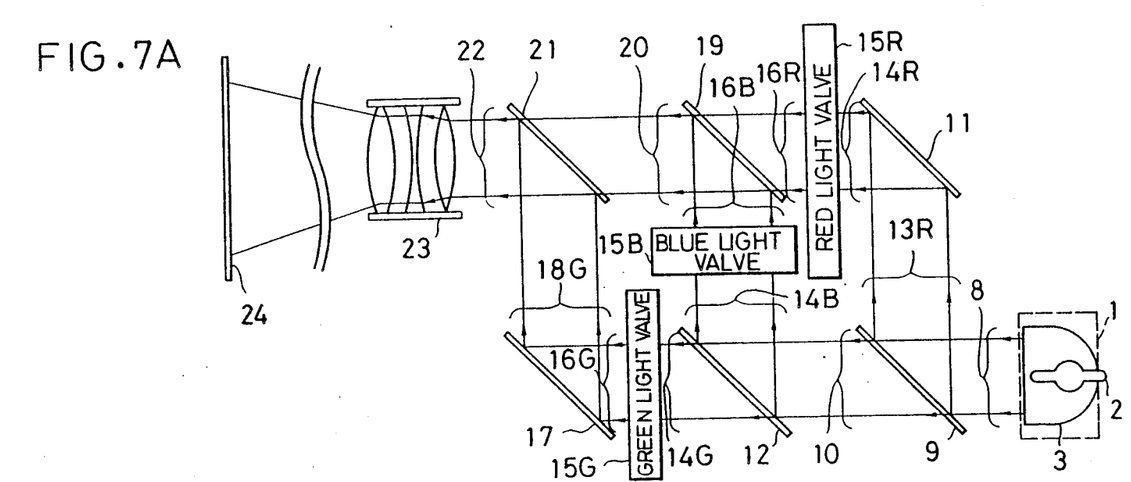
FIG. 7A is a schematic diagram of a projection display device of the prior art.
Figure 7B:
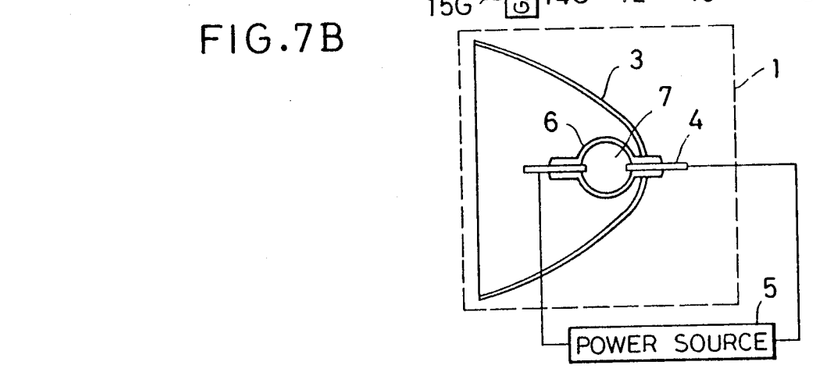
FIG. 7B is an enlarged cross-section view of a light source section of the projection display device shown in FIG. 7A.

FIG. 7A is a schematic diagram of a projection display device of the prior art. FIG. 7B is an enlarged cross-sectional view of a light source section of the projection display device shown in FIG. 7A.

As illustrated, a light source section 1 is comprised of a light source 2 which may be a metal halide lamp emitting white light, and a parabolic reflector or mirror 3, which is concave and which reflects light radiated from the light source 2 and directs that light as a luminous flux of substantially parallel rays and of a circular cross section.

The light source 2 comprises a pair of discharge electrodes 4, between which a luminescent section 7 of the light source is formed. The electrodes 4 are supported by a transparent outer wall 6 made for example of quartz glass. Light source 2 is placed in such a manner that luminescent section 7 constituting a point light source is near the focus of the parabolic mirror 3. A power source 5 is for driving the light source 2.

The light source section 1 emits a luminous flux 8 which travels substantially in parallel, and has a circular cross-section. A dichroic mirror 9 has such a wavelength selectivity that red light flux component 13R of luminous flux 8 is reflected through a substantially right angle (with the angle between the incident and reflected lights being about 90°) while a blue and a green flux components pass through unhindered as luminous flux 10. A reflective mirror 11 reflects red light flux component 13R through a substantially right angle. The luminous flux after the reflection at the reflective mirror 11 is denoted by 14R.

Another dichroic mirror 12 has such a wavelength selectivity that blue light flux component 14B of luminous flux 10 is reflected through a substantially right angle while a green flux component passes through unhindered as luminous flux 14G.

The dichroic mirrors 9 and 12 serve to separate light flux from the illumination system into multiple fluxes of differing wavelength ranges.

Transmission-type light valves 15R, 15B, and 15G perform two-dimensional intensity modulation of luminous fluxes 14R, 14B, and 14G, respectively, at surfaces parallel to those fluxes. The light valves 15R, 15B and 15G modulate the respective fluxes of differing wavelength ranges, and have cross sections identical with each other. They could be, for example, image display panels which utilize the optoelectronic properties of liquid crystals and whose frames are normally rectangular in shape. The ratio of height to width would be 3:4 for the NTSC format; and, 9:16 for the high-definition television (HDTV) format. These light valves are driven by TV signals or the like. In other words, the light intensity is modulated along the surface of the panel, i.e., subjected to space or two-dimensional modulation. The diagonal screen size of a light valve is usually somewhere between one to five inches.

Luminescent fluxes that have been two-dimensional intensity modulated by the transmission-type light valves 15R, 15B, and 15G are denoted by 16R, 16B, and 16G, respectively.

A mirror 17 reflects flux component 16G through a substantially right angle. The luminous flux after the reflection at the mirror 17 is denoted by 18G. A dichroic mirror 19 passes the flux component 16R unhindered, and reflects the flux component 16B through a substantially right angle, and which thereby merges flux components 16R and 16B to form luminous flux 20. Likewise, another dichroic mirror 21 passes luminous flux 20 unhindered, and reflects flux component 18G through a substantially right angle, and which thereby merges luminous flux 20 and flux component 18G to form luminous flux 22. In summary, luminous flux 22 is therefore a flux created by merging red, blue, and green flux components after they have been intensity-modulated at their respective light valves.

A projection lens 23 projects luminous flux 22 onto a screen 24: that is, enlarged real images of the image on the light valves 15R, 15B, and 15G are formed on the screen 24. This diagonal screen size is generally somewhere in the range of 20 to 200 inches.

The light valves 15R, 15B, and 15G are all located at an equal distance (distance along the optical path) from the projection lens. In addition, the cross-sectional area of the luminous flux shone into light valves 15R, 15B, and 15G is made slightly larger than that of the light valves themselves.

Figure 8A:
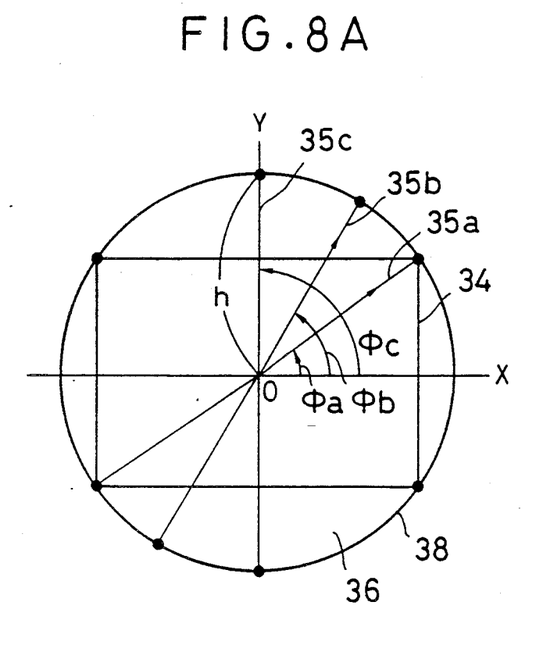
FIG. 8A and FIG. 8B are diagrams for explaining the action of a prior-art light source device.
Figure 8B:
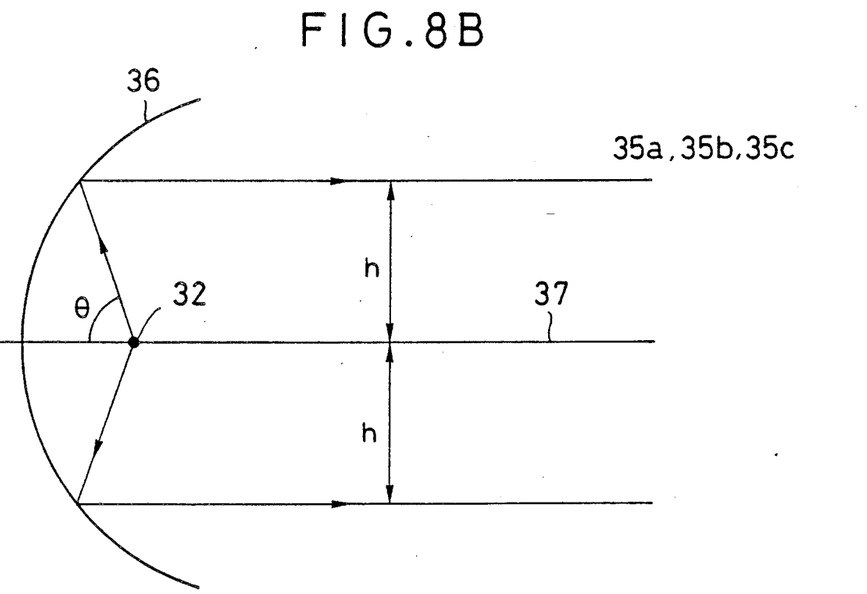

FIG. 8A and FIG. 8B are diagrams for explaining the action of a prior-art light source device. Let us consider light beams 35a, 35b, and 35c, which are, before being reflected off parabolic mirror 36, all on the same cone described (with the luminescent section 7 as the vertex) by the angle $\theta$ (relative to the optical axis), and have an angle of rotation (around the optical axis and relative to the x-axis) of $\phi_a$, $\phi_b$, and $\phi_c$, respectively.

Upon being reflected off parabolic mirror 36, light beams 35a, 35b, and 35c all become parallel to and equidistant from optical axis 37. It will thus be appreciated that the assembly of all the beams emanating from the light source and reflected at the parabolic mirror 36 which is disk-shaped as viewed in the direction of the optical axis 37 form a luminous flux 38 having a circular cross section.

Returning to FIG. 7A, white light emitted from the light source 2 is reflected off parabolic mirror 3, thereby creating a flux which has a circular cross section and which travels substantially parallel. This flux is broken down into red, blue, and green flux components 14R, 14B, and 14G by dichroic mirrors 9 and 12. The flux components, in which the light is substantially parallel, are two-dimensional intensity modulated by their respective light valves 15R, 15B, and 15G. Images which appear on the light valves are projected, being enlarged, onto the screen 24 by the projection lens 23, thereby allowing a viewer to watch an enlarged TV video image or the like.

Figure 9:
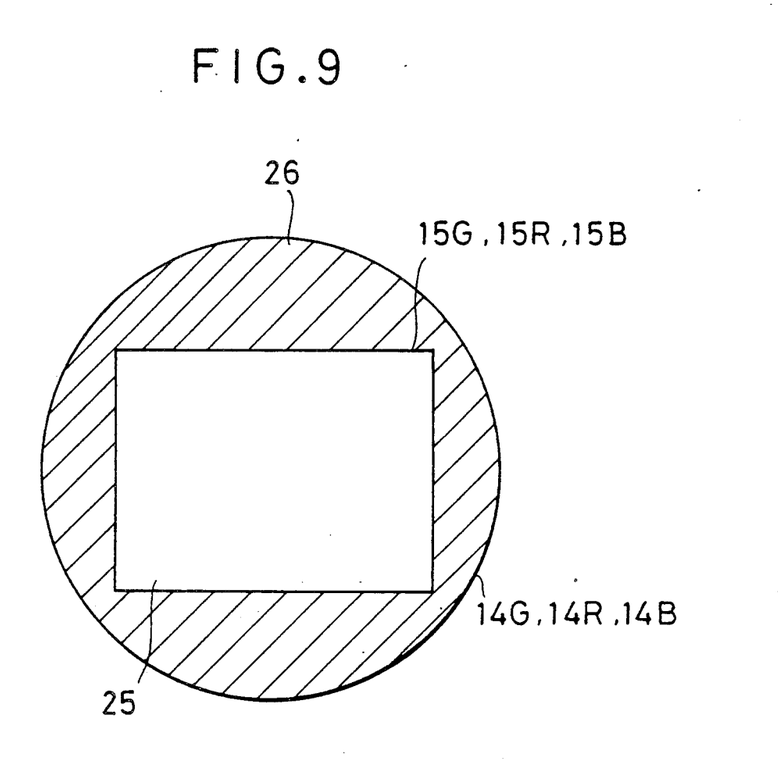
FIG. 9 shows luminous flux as shone onto a light valve in a prior-art projection display device.

Since a prior-art projection display device is configured in a manner described above, of the circular cross section of luminous fluxes 14R, 14G, and 14B, part only luminous flux 25 falling on rectangular light valves 15R, 15G, and 15B (white section of FIG. 9) is utilized; the remaining luminous flux portion 26 (hatched section of FIG. 9) is discarded. For the NTSC format, that is, for a height to width ratio of 3:4, a fairly small proportion (61%) of the luminous flux is utilized even when the size of the circular flux is such that it just covers the corners of the light valve. The remainder (39%) of the luminous flux is discarded (not utilized). There are several problems with this approach. One is that, even if a metal halide lamp (which has a light emitting efficiency that is one of the highest among the light sources currently available) is used, the brightness of such a projection display is not as good as that of a CRT; therefore, it is necessary that the efficiency of light source utilization be increased as much as possible.

SUMMARY OF THE INVENTION

The invention was developed to solve these problems and its object is to provide of a projection display device with which, as a result of reducing the amount of luminous flux discarded at the light valves, a brighter picture can be obtained.

A projection display device of the invention has an optical collimating system that, instead of outputting the luminous flux over a circular cross section, outputs it over a rectangular cross section, or a section of a shape which corresponds to the shape of the frame of the light valve.

According to the invention, luminous flux emanating from a light source section is converted into a parallel rectangular flux of a cross section corresponding to the shape of the frame of the light valves. Compared with the prior art, this allows a greater amount of luminous flux to be shone into the light valve and thereby increases the utilization efficiency of the flux output from the light source.

DETAILED DESCRIPTION OF THE PREFERRED EMBODIMENTS

Embodiments of the invention will now be described.

Figure 1A:
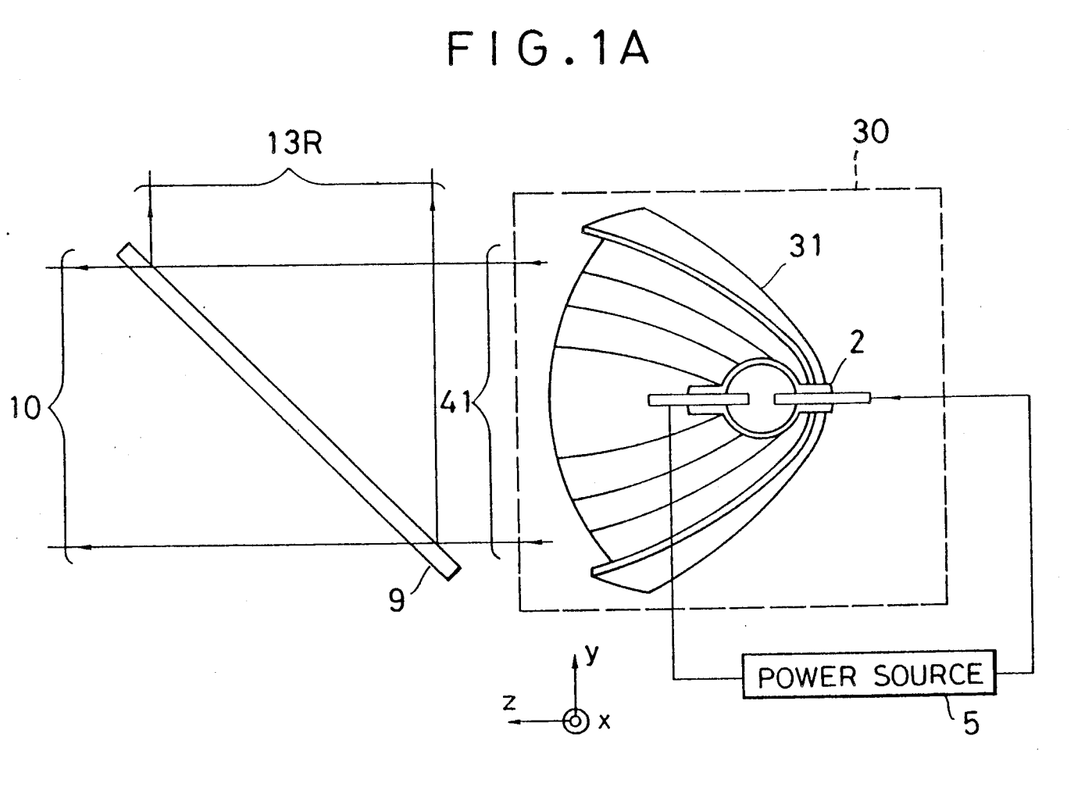
FIG. 1A and FIG. 1B are schematic diagrams showing a light source section which is a pertinent portion of a projection display device of an embodiment of the invention.
Figure 1B:
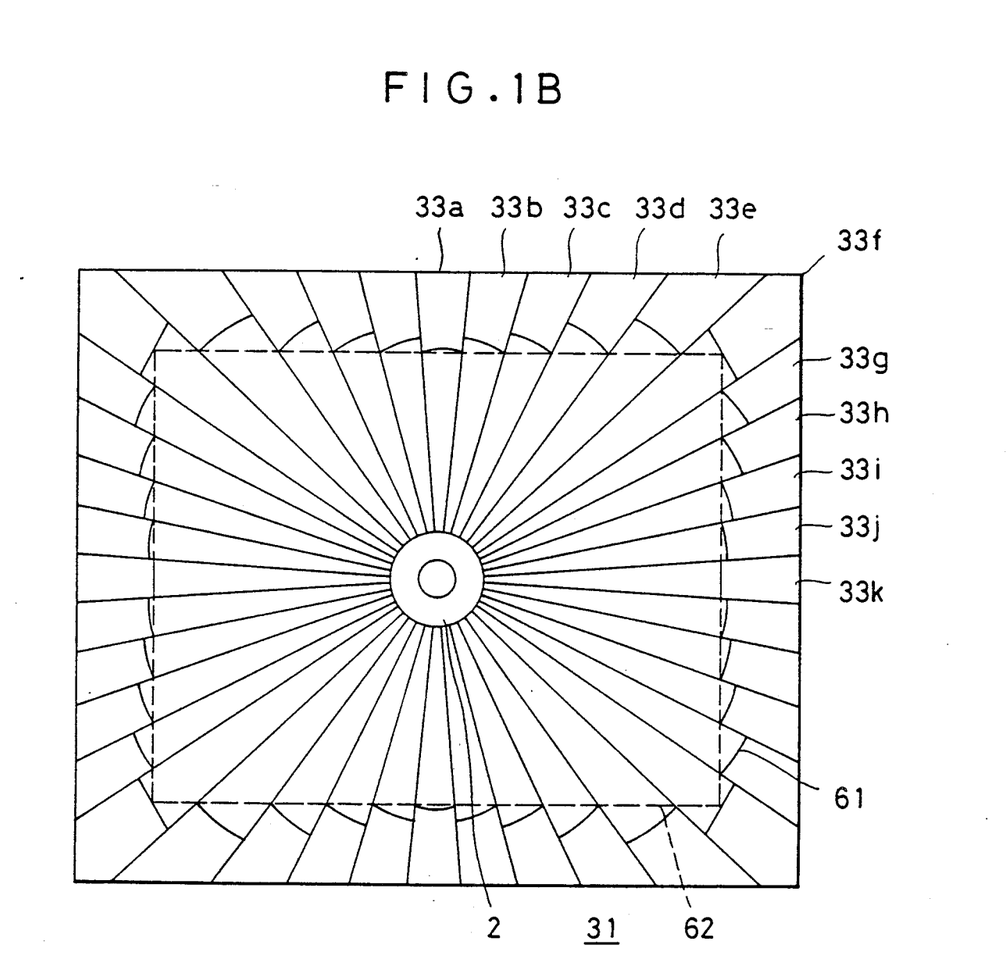

FIG. 1A and FIG. 1B are schematic diagrams showing a light source section, which is a pertinent portion of a projection display device according to one embodiment of the invention.

The overall configuration of the projection display device of this embodiment is identical to that shown in and described with reference to FIG. 7A and FIG. 7B.

In FIG. 1A, the z-axis which represents the optical axis which runs horizontally along the plane of the paper, the x-axis runs normal to the plane of the paper, and the y-axis runs vertically along the plane of the paper. A light source section 30 comprises a light source 2 similar to the light source 2 of the prior art (having a luminescent section constituting a point light source) for emitting light in substantially all radial directions. In this specification, the light source 2 itself is also called a point light source.

The light source section 30 also comprises an illumination optical system in the form of a parabolic reflector 31 which converts the light emitted from the light source 2 into a substantially parallel luminous flux. The luminous flux from the parabolic reflector 31 has a cross section of substantially the same size and shape as the shapes of the frames of the light valves 15R, 15B and 15G.

The parabolic reflector 31 is comprised of a plurality of parabolic mirror segments 33a to 33k, as shown in FIG. 1B. Each of the parabolic mirror segments 33a to 33k is in the form of a sector as viewed in the direction of the optical axis 37. The parabolic mirror segments 33a to 33k have focuses substantially coincident with the location of a luminescent section of the light source 2. The surfaces of the collimating lens segments are so positioned and configured that light beams emanating from the point light source that are positioned on a circle centered on the optical axis will be, in the light flux after the reflection, on a frame which is similar (having corresponding dimensions proportional and corresponding angles equal) to the frame of the light valves. More specifically, the focal lengths (distances from the focus to the vertex) of the parabolic mirror segments 33a to 33k are so determined that the intersections 61 of the parabolic mirror segments 33a to 33k and a cone with its vertex coincident with the focus of the parabolic mirror segments are substantially along a common imaginary frame 62 indicated by dotted line having the same size and shape, as the shape of the frame of the light valve and having its center on the optical axis 37.

Figure 2:
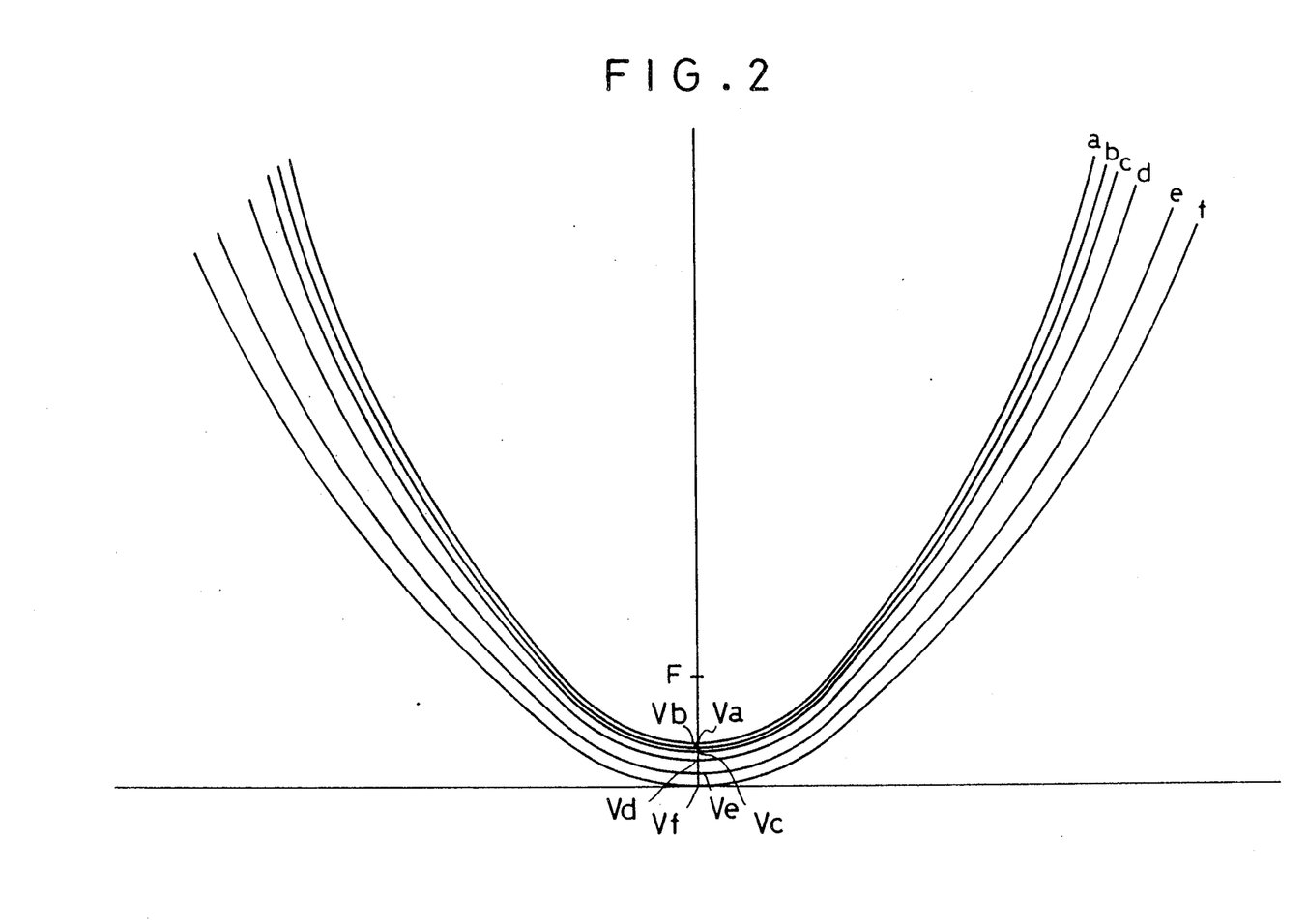
FIG. 2 is a diagram showing the surfaces of the parabolic mirror segments of the embodiment of FIG. 1A and FIG. 1B.

FIG. 2 shows parabolic curves having a common focus F and having different focal lengths, i.e., the distances from the focus F to the vertexes Va to Vf. The curves a to f respectively represent the surfaces of the parabolic mirror segments 33a to 33f.

Figure 3A:
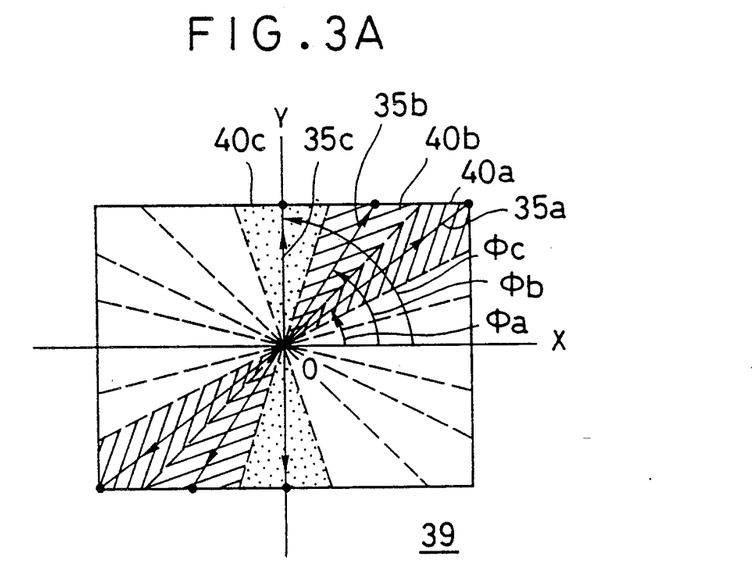
FIG. 3A and FIG. 3B are diagrams for explaining the operation of the parabolic mirror segments.
Figure 3B:
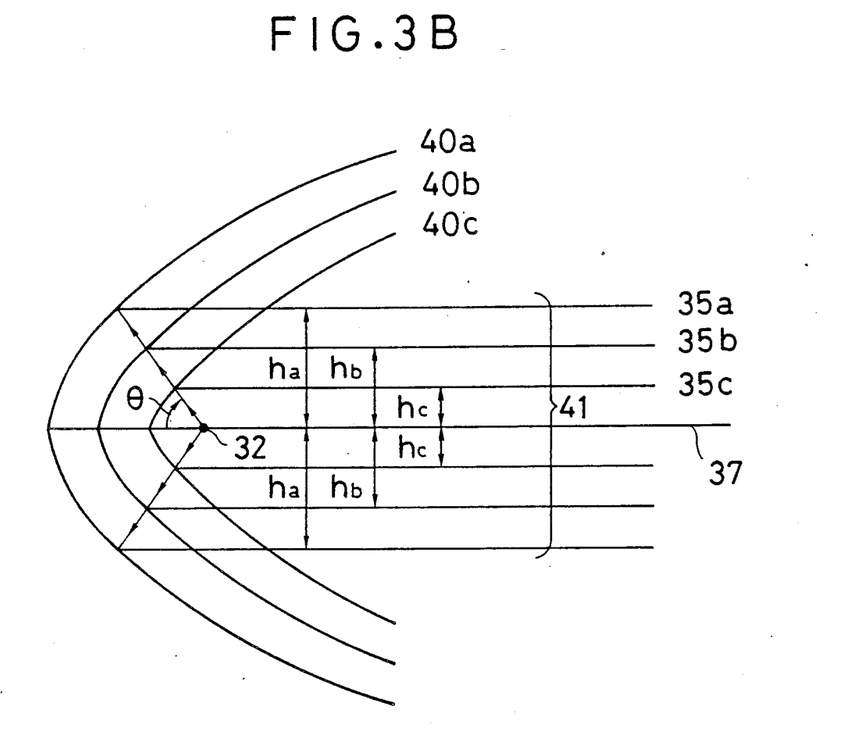

The focal lengths of parabolic mirrors 40a, 40b, and 40c (which are in the form of a sector making up a portion of the concave surface of reflective mirror 39) vary depending on the angle of rotation (around the optical axis) $\phi_a$, $\phi_b$, or $\phi_c$ of light beams 35a, 35b, and 35c. Let us consider light beams 35a, 35b, and 35c, which are all on the same cone described by angle $\theta$ (relative to the optical axis) and have angles of rotation (around the optical axis and relative to the x-axis) of $\phi_a$, $\phi_b$, and $\phi_c$, respectively. Upon being reflected off the parabolic mirror 36, the light beams 35a, 35b, and 35c all become parallel to and at different distances ha, hb and hc from optical axis 37. Moreover, the parabolic mirror segments are so configured that the cross section of the parallel light flux will have the same shape and same size as the frames of the light valves. By this, of the total luminous flux shone on the light valve, the proportion utilized is larger and the proportion discarded is correspondingly smaller. As a result, the brightness of an image projection on a screen by the projectiopn lens increases.

Note that while the reflector shown in FIG. 1B is not continuous, the more the parabolic segments are partitioned into smaller sector segments, the greater will be the smoothness of the resulting rectangular cross section.

In this way, luminous flux output from the light source 2 is reflected by the parabolic reflector 31 and converted into a luminous flux 41 of substantially rectangular shape, which functions in the same manner as luminous flux 8 of the prior art. That is, just as in a prior-art device, the luminous flux 41 is divided into red, blue, and green flux components by the dichroic mirrors, 9 and 12, is two-dimensional intensity modulated by the light valves 15R, 15B, and 15G, is merged by the dichroic mirrors 19 and 21, and is projected in magnification on the screen 24 by the projection lens 23.

Figure 4:
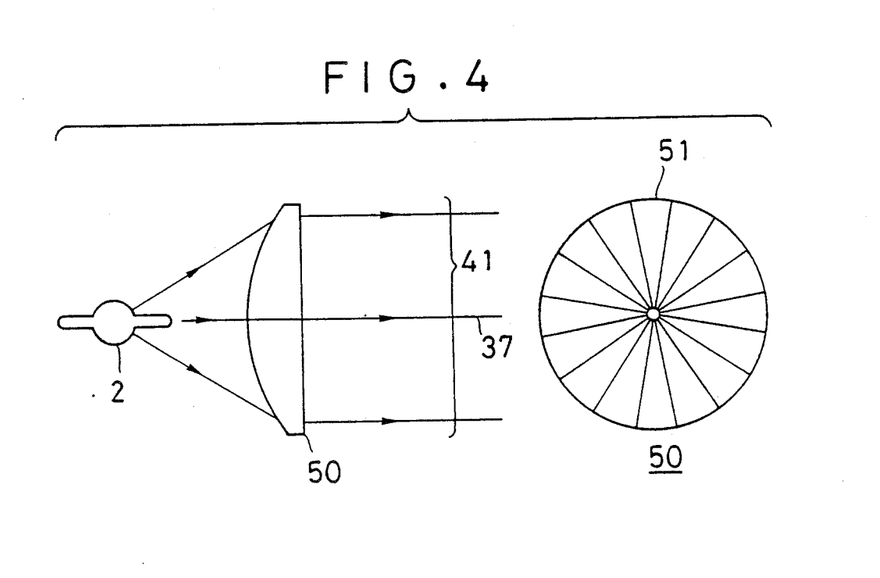
FIG. 4 and FIG. 5 are schematic diagrams showing further embodiments of the illumination optical systems according to the invention.

Note that in the embodiment described above, the parabolic reflector 31 was used to reflect light emanating toward the back of the light source 2 out toward the front. But, as shown in FIG. 4, a rectangular luminous flux may also be created by the use of a collimating lens 50 made up of a plurality of sector-shaped collimating lens segments 51a to 51p.

More specifically, the collimating lens 50 is comprised of a plurality of collimating lens segments 51a to 51p having focuses substantially coincident with the location of a luminescent section of the light source 2. Each is in the form of a sector as viewed in the direction of the optical axis 37. The surfaces of the collimating lens segments are so positioned and configured that light beams emanating from the point light source that are positioned on a circle centered on the optical axis will be, in the light flux after the collimation, on a frame which is similar (having corresponding dimensions proportional and corresponding angles equal) to the frame of the light valves.

Figure 5:
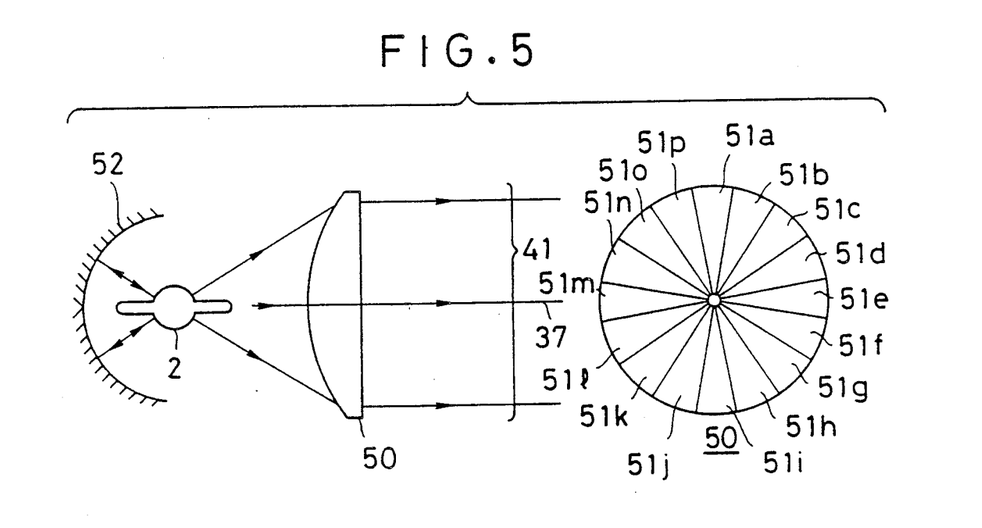

Furthermore, as shown in FIG. 5, brightness can be increased further by placing a spherical mirror 52 behind the light source 2, so that light emanating from the back of the light source is reflected out front. More specifically, the spherical mirror 52 has its center coincident with the luminous part of the light source 2 and is disposed opposite the collimating lens segments 51a to 51 p to reflect the light from the light source back toward the collimating lens segments 51a to 51 p.

Figure 6:
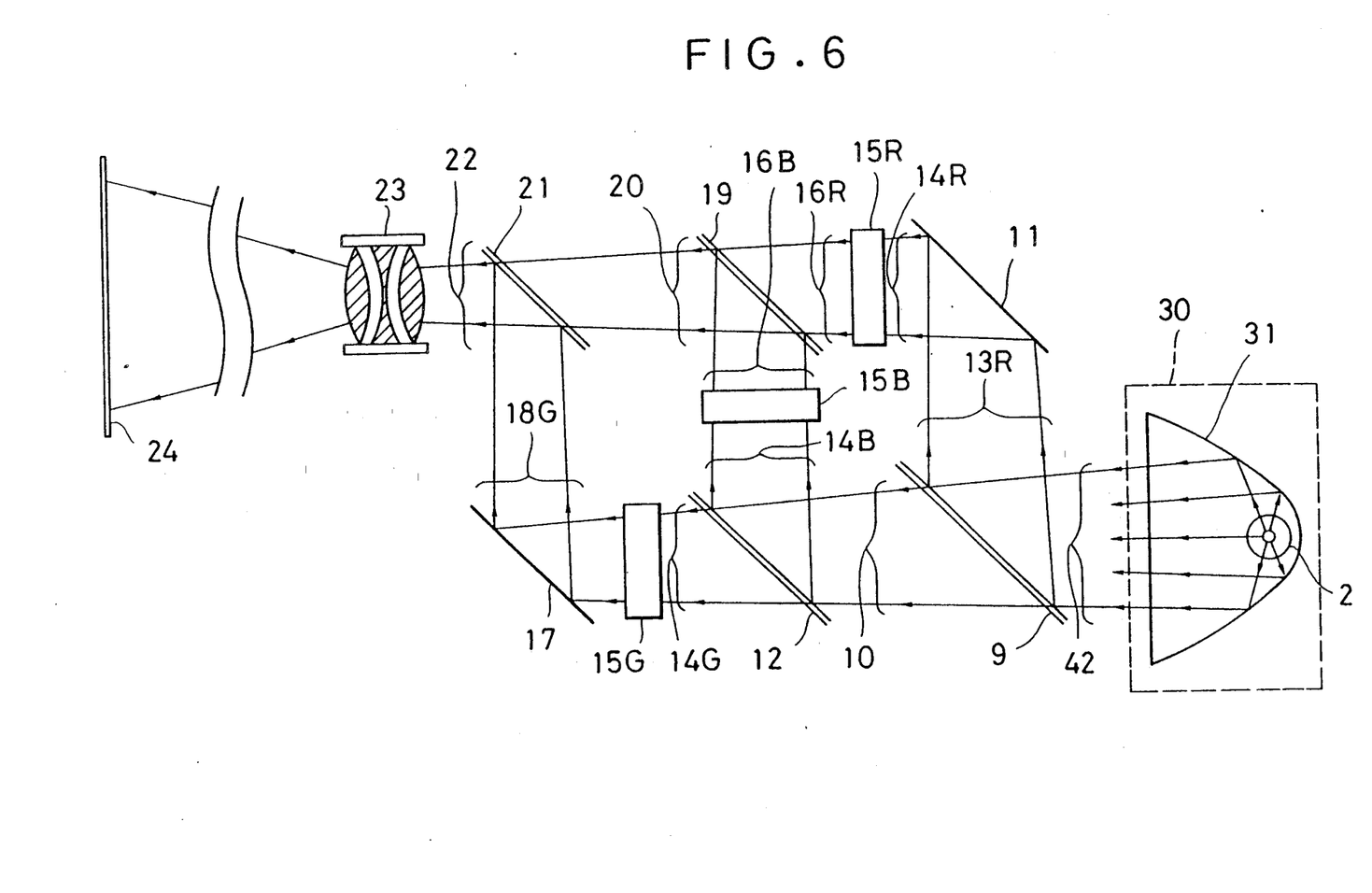
FIG. 6 is schematic diagram showing a further embodiment of the projection display device according to the invention.

In the embodiments described above, light from the light source was reflected off parabolic reflector 31 to become a parallel luminous flux. However, as shown in FIG. 6, luminous flux shone out from light source section 30 may be a non-parallel luminous flux 42 instead of a parallel luminous flux. In the embodiment illustrated in FIG. 6, the luminous flux is one with its cross section gradually being reduced.

Thus, the size of the frame formed of the intersections between the parabolic mirror segments of the collimating lens segments and the cone may not necessarily identical with the shape of the frame of the light valve, but what is essential is that the frame formed of the intersections and the frame of the light valve are similar, i.e., have corresponding dimensions proportional and corresponding angles equal.

As described above, by using an illumination optical system comprised of sector-shaped parabolic mirror segments, or sector-shaped collimating lens segments, utilization efficiency of a luminous flux from a light source can be increased, and the brightness of an image projected onto a screen is thereby increased.

What is claimed is:

1. A projection display device comprising:
   a light source for emitting light in substantially all radial directions;
   an illumination optical system which converts the light emitted from said light source into a substantially parallel luminous flux;
   a light valve which modulates the luminous flux; and
   an optical projection system which projects images from said light valve onto a screen;
   wherein said illumination optical system converts the light into a substantially parallel luminous flux having a cross section similar to the shape of a frame of said light valve;
   said illumination optical system including a plurality of parabolic mirror segments having foci substantially coincident with the location of said light source;
   said plurality of parabolic mirror segments each being in the form of a sector viewed in the direction of the optical axis;
   wherein the surfaces of said plurality of parabolic mirror segments are so positioned and configured such that light that emanates from said light source and is positioned on a circle centered on the optical axis will be, in the light flux after the collimation, on a frame which is similar in shape to the frame of said light valve.

2. The device of claim 1, wherein the frame of said light valve has a rectangular cross section.

3. The device of claim 1, further comprising
   an optical separation system for separating the luminous flux converted by said illumination optical system into a plurality of fluxes of differing wavelength ranges; and
   a plurality of said light valves, having frames which are similar in shape, for modulating the plurality of fluxes of differing wavelength ranges.

4. The device of claim 1, wherein
   the focal lengths of said plurality of parabolic mirror segments are positioned such that the intersections of said plurality of parabolic mirror segments and a cone with its vertex coincident with the focus of the parabolic mirror segments are substantially along a common imaginary frame, similar in shape to the frame of the said light valve.

5. A projection display device comprising:
   a light source;
   an illumination optical system which converts light emitted from said light source into a substantially parallel luminous flux;
   a light valve which modulates the luminous flux; and
   an optical projection system which projects images from said light valve onto a screen;
   wherein said illumination optical system converts the light into a luminous flux having a cross section similar to the shape of the frame of the light valve;
   said illumination optical system including a plurality of collimating lens segments in the form of a sector as viewed in the direction of the optical axis, and having foci which are substantially coincident with each other and are on the optical axis.

6. The device of claim 5, wherein said plurality of collimating lens segments have foci substantially coincident with the location of said light source.

7. The device of claim 6, wherein said plurality of collimating lens segments are positioned and configured such that light beams emanating from said light source which are positioned on a circle centered on the optical axis will be, in the light flux after the collimation, on a frame which is similar in shape to the frame of the light valve.

8. The device of claim 5, further comprising:
a spherical mirror having its center coincident with said light source and disposed opposite said plurality of collimating lens segments to reflect the light from said point light source back toward said plurality of collimating lens segments.

* * * * *